US012349022B2

(12) United States Patent
Guan et al.

(10) Patent No.: US 12,349,022 B2
(45) Date of Patent: Jul. 1, 2025

(54) METHOD FOR SENDING RECOMMENDATION INFORMATION AND POSITIONING SERVICE DEVICE (71) Applicant: BOE Technology Group Co., Ltd., Beijing (CN)

(72) Inventors: Enhui Guan, Beijing (CN); Kui Wu, Beijing (CN); Hongbo Feng, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/756,683

(22) PCT Filed: Apr. 30, 2021

(86) PCT No.: PCT/CN2021/091344
§ 371 (c)(1),
(2) Date: May 31, 2022

(87) PCT Pub. No.: WO2022/226966
PCT Pub. Date: Nov. 3, 2022

(65) Prior Publication Data
US 2024/0205640 A1 Jun. 20, 2024

(51) Int. Cl.
H04W 4/021 (2018.01)
G01S 13/76 (2006.01)
H04W 4/02 (2018.01)

(52) U.S. Cl.
CPC ............ H04W 4/021 (2013.01); G01S 13/765 (2013.01)

(58) Field of Classification Search
CPC ........ G01S 13/765; H04W 4/02; H04W 4/021
See application file for complete search history.

(56) References Cited

U.S. PATENT DOCUMENTS 5,499,395 A * 3/1996 Doi .................. H04W 16/08
370/328
10,477,602 B2 * 11/2019 Fraccaroli ............ H04W 76/14
(Continued)

FOREIGN PATENT DOCUMENTS

CN 103905992 A 7/2014
CN 104065751 A 9/2014
(Continued)

OTHER PUBLICATIONS

Michael Taynnan Barros, "Integrated Terahertz Communication With Reflectors for 5G Small-Cell Networks", IEEE Transactions on Vehicular Technology ( vol. 66, Issue: 7, Jul. 2017), 5647-5657, 10.1109/TVT.2016.2639326 (Year: 2017).*
(Continued)

Primary Examiner — Asghar H Bilgrami
(74) Attorney, Agent, or Firm — Workman Nydegger (57) ABSTRACT The present disclosure discloses a method for sending recommendation information and a positioning service device. The method includes: receiving feedback signals sent by user terminals within a signal coverage range of the positioning service device, where each feedback signal carries a first signal strength and a first signal direction of a radio-frequency signal sent by the positioning service device and received by the corresponding user terminal; determining, according to the first signal strength and the first signal direction corresponding to each user terminal, a main region where the user terminals are concentrated within the signal coverage range; and adjusting a signal sending direction of each radio-frequency signal to a direction where the main region is located and sending the recommendation information, where the recommendation information is borne by the radio-frequency signals.

12 Claims, 8 Drawing Sheets (56) References Cited

U.S. PATENT DOCUMENTS

| | | | |
|---|---|---|---|
| 11,356,810 B1* | 6/2022 | Akpinar | G16H 50/80 |
| 2012/0225663 A1 | 9/2012 | Gupta et al. | |
| 2013/0095846 A1* | 4/2013 | Brisebois | H04W 8/22 |
| | | | 455/456.1 |
| 2013/0250931 A1 | 9/2013 | Abraham et al. | |
| 2015/0092651 A1* | 4/2015 | Chow | H04B 10/25752 |
| | | | 370/312 |
| 2018/0020440 A1* | 1/2018 | Stuck | H04W 28/065 |
| 2022/0150849 A1 | 5/2022 | Zhao et al. | |

FOREIGN PATENT DOCUMENTS

| | | | | |
|---|---|---|---|---|
| CN | 104076323 | A | | 10/2014 |
| CN | 104170417 | A | | 11/2014 |
| CN | 105137390 | A | | 12/2015 |
| CN | 106444771 | A | | 2/2017 |
| CN | 106686071 | A | | 5/2017 |
| CN | 106804042 | A | | 6/2017 |
| CN | 106856614 | A | | 6/2017 |
| CN | 107238716 | A | | 10/2017 |
| CN | 108615978 | A | * 10/2018 | ............... H01Q 3/00 |
| CN | 108956464 | A | | 12/2018 |
| CN | 108989986 | A | | 12/2018 |
| CN | 109963291 | A | | 7/2019 |
| CN | 110972068 | A | | 4/2020 |
| CN | 111163420 | A | | 5/2020 |
| CN | 111343570 | A | | 6/2020 |
| CN | 111464948 | A | | 7/2020 |
| CN | 111585729 | A1 | | 8/2020 |
| CN | 111738768 | A | | 10/2020 |
| KR | 1020130141785 | A | | 12/2013 |

OTHER PUBLICATIONS

Chinese First Office Action, mailed Jan. 4, 2025, for Chinese App. No. 202180000976.7, 19 pages.

* cited by examiner

Fig. 9

METHOD FOR SENDING RECOMMENDATION INFORMATION AND POSITIONING SERVICE DEVICE The present application is a US National Stage of International Application No. PCT/CN2021/091344, filed on Apr. 30, 2021, the entire contents of which are incorporated herein by reference.

FIELD

The present disclosure relates to the field of intelligent systems, in particular to a method for sending recommendation information and a positioning service device.

BACKGROUND

A cloud screen digital signage is mainly configured to promote shops, products, etc. in a shopping mall, and synchronously push information displayed by the cloud screen digital signage to a user's user terminal (such as a mobile phone), which can facilitate the user's understanding of promotional information.

In the prior art, the mobile phone terminal in a signal coverage range of the cloud screen digital signage can usually receive the information pushed by the cloud screen digital signage, but there are exceptions. For example, the user terminal in the signal coverage range of the cloud screen digital signage is blocked, or the number of user terminals is large, which may result in that some user terminals within the signal coverage range of the cloud screen digital signage are not able to receive the information pushed by the cloud screen digital signage, thus leading to a poor effect of the cloud screen digital signage in promoting the shops, products, etc.

SUMMARY

The present disclosure provides a method for sending recommendation information and a positioning service device, to solve the above technical problems in the prior art.

In a first aspect, in order to solve the above technical problems, an embodiment of the present disclosure provides a method for sending recommendation information, applied to a positioning service device. A technical solution of the method is as follows: receiving feedback signals sent by user terminals within a signal coverage range of the positioning service device, where each feedback signal carries a first signal strength and a first signal direction of a radio-frequency signal sent by the positioning service device and received by the corresponding user terminal; determining, according to the first signal strength and the first signal direction corresponding to each user terminal, a main region where the user terminals are concentrated within the signal coverage range; and adjusting a signal sending direction of each radio-frequency signal to a direction where the main region is located and sending the recommendation information, where the recommendation information is borne by the radio-frequency signals.

In one possible implementation, the receiving the feedback signals sent by the user terminals within the signal coverage range of the positioning service device includes: sending the radio-frequency signals to the user terminals within the signal coverage range, so that the user terminals determine the first signal strengths of the radio-frequency signals received; and receiving the feedback signals carrying the first signal strengths from the user terminals.

In one possible implementation, the determining, according to the first signal strength corresponding to each user terminal, the main region where the user terminals are concentrated within the signal coverage range includes: dividing the signal coverage range into a plurality of radian-equal fan-shaped regions within the signal coverage range with a location of the positioning service device as a center; determining each user terminal with the first signal strength reaching a set strength threshold as a valid user terminal, where the set strength threshold is a minimum signal strength at which the each user terminal can actually receive the radio-frequency signal normally; determining a comprehensive feature value of each fan-shaped region according to the total number of valid user terminals contained in each fan-shaped region and fan-shaped regions adjacent to the each fan-shaped region, first signal strengths of the valid user terminals, and relative locations of the valid user terminals to the center in the signal coverage range; and determining a fan-shaped region with a largest comprehensive feature value in the plurality of fan-shaped regions as the main region.

In one possible implementation, the dividing the signal coverage range into the plurality of radian-equal fan-shaped regions with the location of the positioning service device as the center includes: dividing the signal coverage range into 16 equal fan-shaped regions with the location of the positioning service device as the center.

In one possible implementation, the determining the comprehensive feature value of each fan-shaped region according to the total number of the valid user terminals contained in each fan-shaped region and fan-shaped regions adjacent to the each fan-shaped region, the first signal strengths of the valid user terminals, and the relative locations of the valid user terminals to the center in the signal coverage range includes: calculating the total number of the valid user terminals contained in each fan-shaped region; determining, according to a correspondence relationship between preset environmental feature values and the relative locations, a relative location corresponding to the environmental feature value of each valid user terminal, to determine a distance between each user terminal and the center, where each environmental feature value includes the first signal strength and the corresponding first signal direction; and performing weighted calculation on the total number of the valid user terminals contained in each fan-shaped region and fan-shaped regions adjacent to the each fan-shaped region, and the first signal strengths and the distances corresponding to the valid user terminals, to obtain the comprehensive feature value of the each fan-shaped region.

In one possible implementation, the determining the correspondence relationship between the preset environmental feature values and the relative locations includes: gridding the signal coverage range into a plurality of grid regions; detecting a second signal strength and a second signal direction of the radio-frequency signal received by a user terminal in each grid region, and determining the second signal strength and the second signal direction as a network feature value of the each grid region; and relating a location of the each grid region to the network feature value corresponding to the each grid region, to obtain the correspondence relationship between the preset environmental feature values and the relative locations.

In one possible implementation, a formula of the weighted calculation includes:

$$M_i = \sum_{j=1}^{k_i}(a_i k_i + b_i L_j + c_i \alpha_j) +$$

$$\sum_{j=1}^{k_{i-1}}(a_{i-1}k_{i-1} + b_{-li}L_j + c_{i-1}\alpha_j) + \sum_{j=1}^{k_{i+1}}(a_{i+1}k_{i+1} + b_{i+1}L_j + c_{i+1}\alpha_j),$$

where: $M_i$ is the comprehensive feature value of an $i^{th}$ fan-shaped region, $k_i$ is the total number of the valid user terminals in the $i^{th}$ fan-shaped region, $k_{i+1}$ is the total number of the valid user terminals in an $(i+1)^{th}$ fan-shaped region adjacent to the $i^{th}$ fan-shaped region, $k_{i-1}$ is the total number of the valid user terminals in an $(i-1)^{th}$ fan-shaped region adjacent to the $i^{th}$ fan-shaped region, j is a $j^{th}$ valid user terminal in the $i^{th}$ fan-shaped region, $L_j$ is a distance between the $j^{th}$ valid user terminal in the corresponding fan-shaped region and the center, $\alpha_j$ is a signal direction of a radio-frequency signal received by the $j^{th}$ valid user terminal in the corresponding fan-shaped region, i and j are natural numbers, i is smaller than or equal to a total number of the fan-shaped regions in the signal coverage range, j is smaller than or equal to a total number of the valid user terminals in the corresponding fan-shaped region, $a_i$, $b_i$ and $c_i$ are weighting coefficients corresponding to $k_i$, $L_j$ and $\alpha_j$ respectively, $a_{i-1}$, $b_{i-1}$ and $c_{i-1}$ are weighting coefficients corresponding to $k_{i-1}$, $L_{j-1}$ and $\alpha_{j-1}$ respectively, and $a_{i+1}$, $b_{i+1}$ and $c_{i+1}$ are weighting coefficients corresponding to $k_{i+1}$, $L_{j+1}$ and $\alpha_{j+1}$ respectively.

In one possible implementation, the adjusting the signal sending direction of each radio-frequency signal to the direction where the main region is located and sending the recommendation information includes: dividing the signal coverage range into a plurality of signal strength grade regions; determining a due power corresponding to the each radio-frequency signal when the first signal strength of each user terminal reaches a set strength on an outer boundary of a designated signal strength grade region, where the designated signal strength grade region is a signal grade region designated in the plurality of signal strength grade regions, and the outer boundary is a boundary of the designated signal strength grade region away from the positioning service device; determining a smaller one between the due power and a rated power of a phased antenna in the positioning service device as a first sending power for sending the each radio-frequency signal; and sending the each radio-frequency signal carrying the recommendation information at the first sending power in the direction where the main region is located.

In one possible implementation, the determining the due power corresponding to the each radio-frequency signal when the first signal strength of each user terminal reaches the set strength on the outer boundary of the designated signal strength grade region includes: determining the total number of user terminals receiving the radio-frequency signals between an inner boundary of the designated signal strength grade region and a boundary corresponding to a set signal strength, where the inner boundary is a boundary of the designated signal strength grade region close to the positioning service device; determining a second sending power of each user terminal at the outer boundary according to the total number of the user terminals receiving the radio-frequency signals between the inner boundary and the boundary corresponding to the set signal strength and a third signal strength of each user terminal at the outer boundary; and determining a product of the second sending power and a sending power weighting value as the due power.

In one possible implementation, a formula for determining the second sending power of each user terminal at the outer boundary includes: $Q_s = C_s \times N_s + d_s \times a_s$, where $Q_s$ is the second sending power of each user terminal at the outer boundary, $C_s$ is a weighting coefficient, a unit of $C_s$ is power/person, $N_s$ is the total number of the user terminals receiving the radio-frequency signals between the inner boundary and the boundary corresponding to the set signal strength, $d_s$ is a weighting coefficient of the signal strength, $a_s$ is a designated signal strength.

In one possible implementation, the positioning service device adopts a phased antenna array to control sending directions and sending powers of the radio-frequency signals bearing the recommendation information, and controls the sending directions and sending powers of the radio-frequency signals bearing the recommendation information by changing angles of antennas and transmission powers of the antennas in the phased antenna array.

In a second aspect, an embodiment of the present disclosure provides a positioning service device, including: a receiving unit, configured to receive feedback signals sent by user terminals within a signal coverage range of the positioning service device, where each feedback signal carries a first signal strength and a first signal direction of a radio-frequency signal sent by the positioning service device and received by the corresponding user terminal; a determining unit, configured to determine, according to the first signal strength and the first signal direction corresponding to each user terminal, a main region where the user terminals are concentrated within the signal coverage range; and a sending unit, configured to adjust a signal sending direction of each radio-frequency signal to a direction where the main region is located and send the recommendation information, where the recommendation information is borne by the radio-frequency signals.

In one possible implementation, the receiving unit is configured to: send the radio-frequency signals to the user terminals within the signal coverage range, so that the user terminals determine the first signal strengths of the radio-frequency signals received; and receive the feedback signals carrying the first signal strengths from the user terminals.

In one possible implementation, the determining unit is configured to: divide the signal coverage range into a plurality of radian-equal fan-shaped regions within the signal coverage range with a location of the positioning service device as a center; determine each user terminal with the first signal strength reaching a set strength threshold as a valid user terminal, where the set strength threshold is a minimum signal strength at which the each user terminal can actually receive a radio-frequency signal normally; determine a comprehensive feature value of each fan-shaped region according to the total number of valid user terminals contained in each fan-shaped region and fan-shaped regions adjacent to the each fan-shaped region, first signal strengths of the valid user terminals, and relative locations of the valid user terminals to the center in the signal coverage range; and determine a fan-shaped region with a largest comprehensive feature value in the plurality of fan-shaped regions as the main region.

In one possible implementation, the determining unit is further configured to: divide the signal coverage range into 16 equal fan-shaped regions with the location of the positioning service device as the center.

In one possible implementation, the determining unit is further configured to: calculate the total number of the valid user terminals contained in each fan-shaped region; determine, according to a correspondence relationship between preset environmental feature values and relative locations, a relative location corresponding to the environmental feature value of each valid user terminal, to determine a distance between each user terminal and the center, where each environmental feature value includes the first signal strength and the corresponding first signal direction; and perform weighted calculation on the total number of the valid user terminals contained in each fan-shaped region and fan-shaped regions adjacent to the each fan-shaped region, the first signal strengths and the distances corresponding to the valid user terminals, to obtain the comprehensive feature value of each fan-shaped region.

In one possible implementation, the determining unit is further configured to: grid the signal coverage range into a plurality of grid regions; detect a second signal strength and a second signal direction of a radio-frequency signal received by the user terminal in each grid region, and determine the second signal strength and the second signal direction as a network feature value of the each grid region; and relate a location of each grid region to the network feature value corresponding to the each grid region, to obtain the correspondence relationship between the preset environmental feature values and the relative locations.

In one possible implementation, a formula of the weighted calculation includes:

$$M_i = \sum_{j=1}^{k_i}(a_i k_i + b_i L_j + c_i \alpha_j) + \\ \sum_{j=1}^{k_{i-1}}(a_{i-1}k_{i-1} + b_{-li}L_j + c_{i-1}\alpha_j) + \sum_{j=1}^{k_{i+1}}(a_{i+1}k_{i+1} + b_{i+1}L_j + c_{i+1}\alpha_j),$$

where: $M_i$ is the comprehensive feature value of an $i^{th}$ fan-shaped region, $k_i$ is the total number of the valid user terminals in the $i^{th}$ fan-shaped region, $k_{i+1}$ is the total number of the valid user terminals in an $(i+1)^{th}$ fan-shaped region adjacent to the $i^{th}$ fan-shaped region, $k_{i-1}$ is the total number of the valid user terminals in an $(i-1)^{th}$ fan-shaped region adjacent to the $i^{th}$ fan-shaped region, j is a $j^{th}$ valid user terminal in the $i^{th}$ fan-shaped region, $L_j$ is a distance between the $j^{th}$ valid user terminal in the corresponding fan-shaped region and the center, $\alpha_j$ is the signal direction of the radio-frequency signal received by the $j^{th}$ valid user terminal in the corresponding fan-shaped region, i and j are natural numbers, i is smaller than or equal to the total number of the fan-shaped regions in the signal coverage range, j is smaller than or equal to the total number of the valid user terminals in the corresponding fan-shaped region, $a_i$, $b_i$ and $c_i$ are weighting coefficients corresponding to $k_i$, $L_j$ and $\alpha_j$ respectively, $a_{i-1}$, $b_{i-1}$ and $c_{i-1}$ are weighting coefficients corresponding to $k_{i-1}$, $L_{j-1}$ and $\alpha_{j-1}$ respectively, and $a_{i+1}$, $b_{i+1}$ and $c_{i+1}$ are weighting coefficients corresponding to $k_{i+1}$, $L_{j+1}$ and $\alpha_{j+1}$ respectively.

In one possible implementation, the sending unit is further configured to: divide the signal coverage range into a plurality of signal strength grade regions; determine a due power corresponding to the each radio-frequency signal when the first signal strength of each user terminal reaches a set strength on an outer boundary of a designated signal strength grade region, where the designated signal strength grade region is a signal grade region designated in the plurality of signal strength grade regions, and the outer boundary is a boundary of the designated signal strength grade region away from the positioning service device; determine a smaller one between the due power and a rated power of a phased antenna in the positioning service device as a first sending power for sending the each radio-frequency signal; and send the each radio-frequency signal carrying the recommendation information at the first sending power in the direction where the main region is located.

In one possible implementation, the sending unit is further configured to: determine the total number of user terminals receiving the radio-frequency signals between an inner boundary of the designated signal strength grade region and a boundary corresponding to a set signal strength, where the inner boundary is a boundary of the designated signal strength grade region close to the positioning service device; determine a second sending power of each user terminal at the outer boundary according to the total number of the user terminals receiving the radio-frequency signals between the inner boundary and the boundary corresponding to the set signal strength and a third signal strength of each user terminal at the outer boundary; and determine a product of the second sending power and a sending power weighting value as the due power.

In one possible implementation, a formula for determining the second sending power of each user terminal at the outer boundary includes: $Q_s = C_s \times N_s + d_s \times a_s$, where: $Q_s$ is the second sending power of each user terminal at the outer boundary, $C_s$ is a weighting coefficient, a unit of $C_s$ is power/person, $N_s$ is the total number of the user terminals receiving the radio-frequency signals between the inner boundary and the boundary corresponding to the set signal strength, $d_s$ is a weighting coefficient of the signal strength, $a_s$ is a designated signal strength.

In one possible implementation, the positioning service device adopts a phased antenna array to control sending directions and sending powers of the radio-frequency signals bearing the recommendation information, and controls the sending directions and sending powers of the radio-frequency signals bearing the recommendation information by changing angles of antennas and transmission powers of the antennas in the phased antenna array.

In a third aspect, an embodiment of the present disclosure further provides a positioning service device, including: at least one processor; and a memory connected with the at least one processor; where the memory stores an instruction executable by the at least one processor, and the at least one processor executes the method according to the first aspect above by executing the instruction stored by the memory.

DETAILED DESCRIPTION OF THE EMBODIMENTS

Embodiments of the present disclosure provide a method for sending recommendation information and a positioning service device, to solve the above technical problems in the prior art.

For a better understanding of the above technical solutions, the technical solutions of the present disclosure will be described in detail below through the accompanying drawings and specific embodiments. It should be understood that the embodiments of the present disclosure and specific features in the embodiments are detailed descriptions of the technical solutions of the present disclosure, rather than limitations to the technical solutions of the present disclosure. In the case of no conflict, the embodiments of the present disclosure and the technical features in the embodiments may be combined with one other.

In the embodiments provided by the present disclosure, the positioning service device is mainly used in a shopping mall to display shops, products and other information recommended to users on a screen and to transmit the displayed information to surrounding user terminals (such as mobile phones) via radio-frequency signals bearing the displayed information, so that the users may view the same content as displayed on the positioning service device or even more content on the user terminals.

Figure 1:
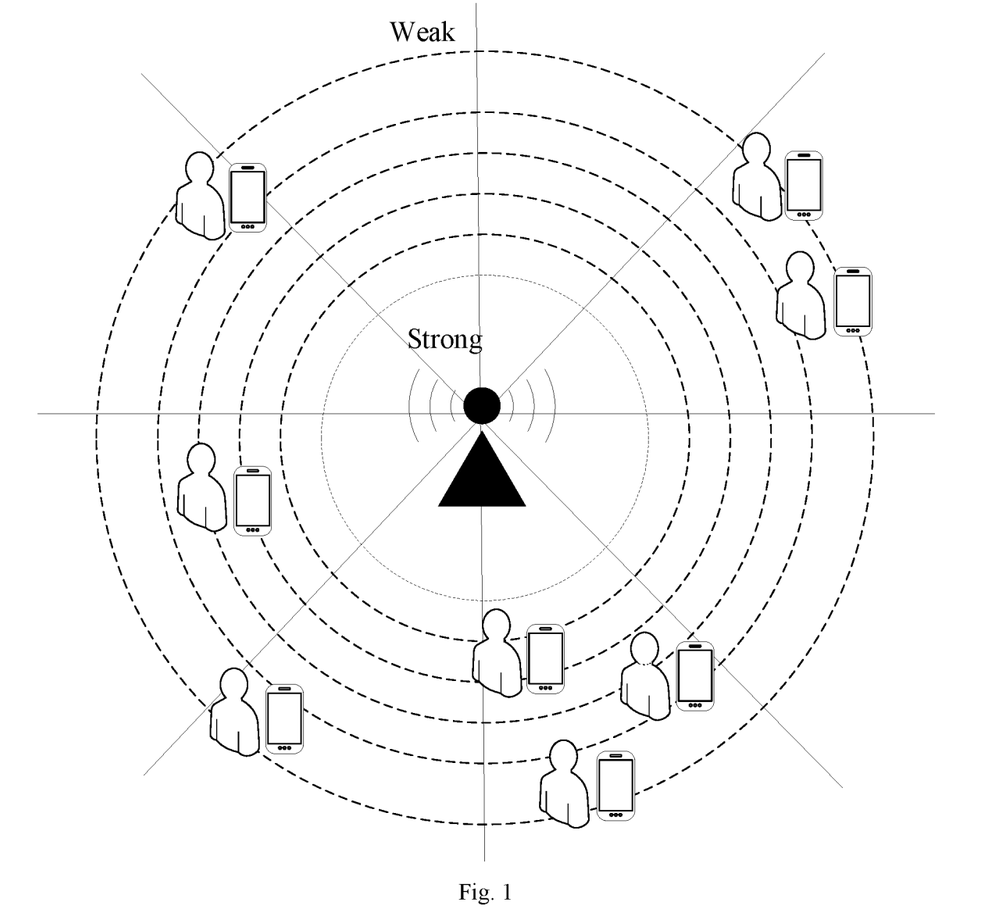
FIG. 1 is a schematic diagram of signal strengths when there is no obstruction within a signal coverage range of a positioning service device provided by an embodiment of the present disclosure.

Referring to FIG. 1, FIG. 1 is a schematic diagram of signal strengths when there is no obstruction within a signal coverage range of a positioning service device provided by an embodiment of the present disclosure. When there is no obstruction within the signal coverage range of the positioning service device, because signal attenuation is regular, changes of signal strengths are also regular.

Figure 2:
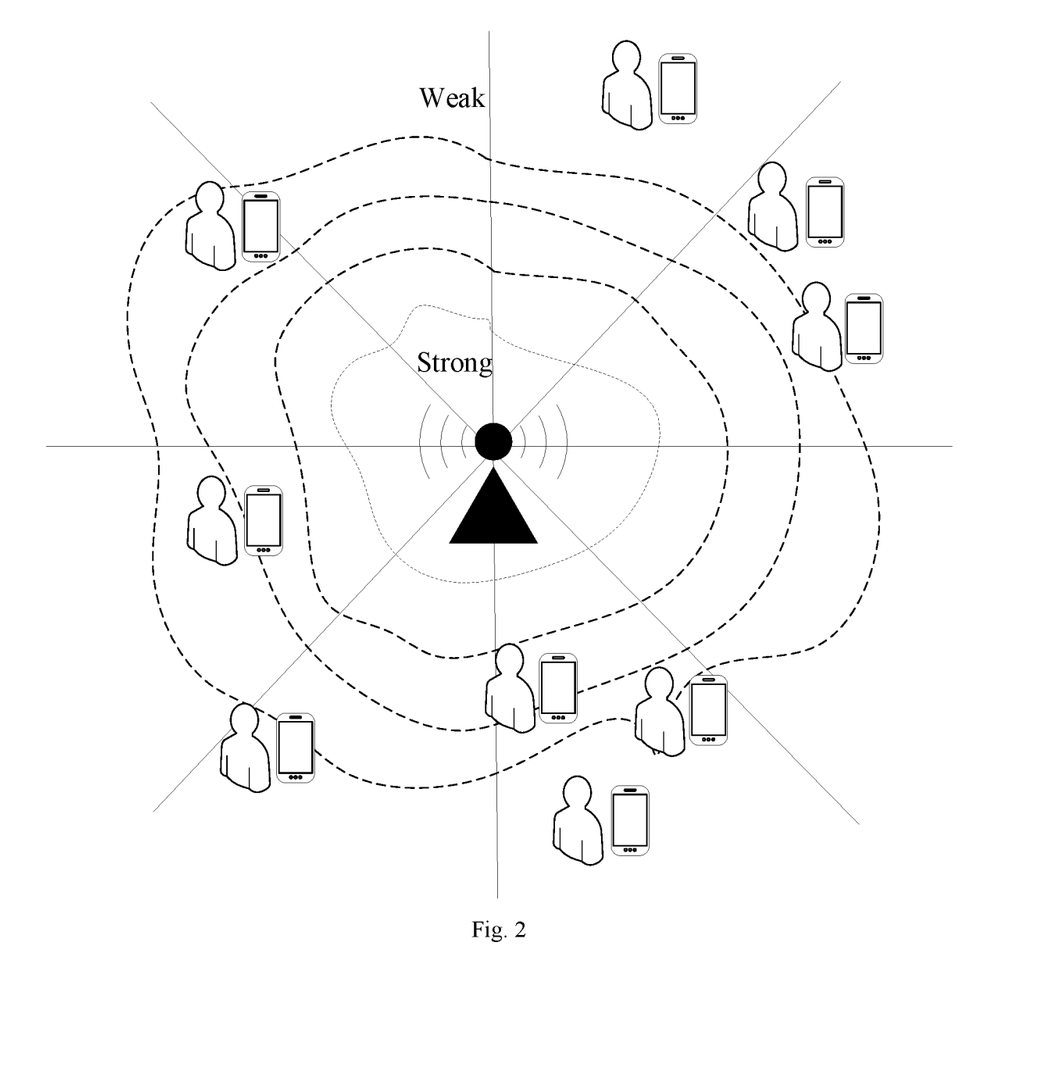
FIG. 2 is a schematic diagram of signal strengths when there are obstructions within a signal coverage range of a positioning service device provided by an embodiment of the present disclosure.

However, due to complexity of an indoor environment, for example, if there is influence of blocking by shelves, blocking by buildings (for example, bearing columns) or the number of persons, the signal strengths at the same distance from the positioning service device are different. Referring to FIG. 2, FIG. 2 is a schematic diagram of signal strengths when there are obstructions within a signal coverage range of a positioning service device provided by an embodiment of the present disclosure. Signals are poor in some places and the user terminals cannot receive or can only intermittently receive radio-frequency signals from the positioning service device, so an arrival rate of recommendation information pushed by the positioning service device is relatively low. The arrival rate of the recommendation information is a ratio of the number of persons receiving the recommendation information (because one user holds one user terminal usually, the number of persons may also be the number of user terminals) within the signal coverage range of the positioning service device to the total number of persons (the total number of user terminals) in the signal coverage range.

It should be noted that one dotted line in FIG. 1 and FIG. 2 represents the same signal strength.

Figure 3:
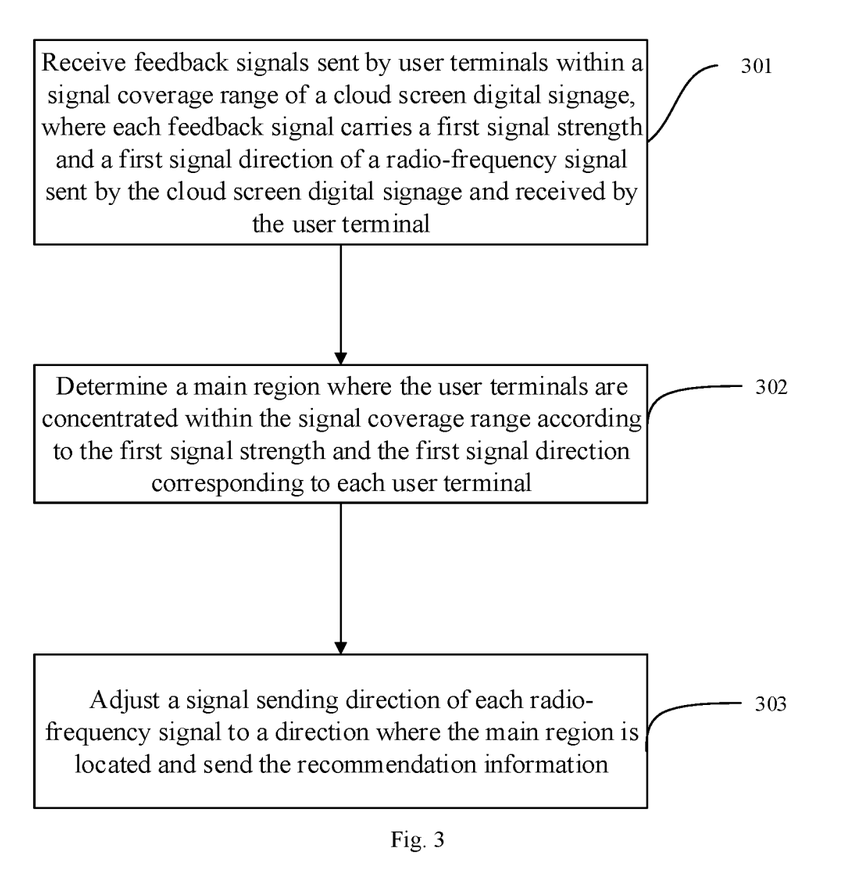
FIG. 3 is a flow chart of a method for sending recommendation information provided by an embodiment of the present disclosure.

Referring to FIG. 3, an embodiment of the present disclosure provides a method for sending recommendation information, applied to a positioning service device. A processing process of the method is as follows.

Step 301: feedback signals sent by user terminals within a signal coverage range of the positioning service device are received. Each feedback signal carries a first signal strength and a first signal direction of a radio-frequency signal sent by the positioning service device and received by the corresponding user terminal.

The receiving the feedback signals from the user terminals may be implemented through the following: the radio-frequency signals are sent to the user terminals within the signal coverage range, so that the user terminals determine the first signal strengths and the first signal directions of the radio-frequency signals received and send the first signal strengths and the first signal directions to the positioning service device through the corresponding feedback signals; and the positioning service device receives the feedback signals carrying the first signal strengths and the first signal directions from the user terminals.

For example, FIG. 1 is taken as an example, the positioning service device sends the radio-frequency signals to the user terminals within its signal coverage range, and the user terminals detect signal strengths and signal directions (recorded as the first signal strengths and the first signal directions) of the radio-frequency signals received and send the first signal strengths and the first signal directions to the positioning service device through feedback information carrying the first signal strengths and the first signal directions. The positioning service device may determine the first signal strengths and the first signal directions of the radio-frequency signals actually received by the user terminals upon receiving the feedback signals sent by the user terminals.

Step 302 to step 303 may be executed after receiving the feedback signals sent by the user terminals.

Step 302: a main region where the user terminals are concentrated within the signal coverage range is determined according to the first signal strength and the first signal direction corresponding to each of the user terminals. In practical application, the main region where the user terminals are concentrated within the signal coverage range of the positioning service device may also be determined in a way that the positioning service device detects signal strengths and signal directions of the feedback signals sent by the user terminals.

Step 303: a signal sending direction of each of the radio-frequency signals is adjusted to a direction where the main region is located and the recommendation information is sent. The recommendation information is borne by the radio-frequency signals.

Determining, according to the first signal strength corresponding to each user terminal, the main region where the user terminals are concentrated within the signal coverage range may be implemented through the following: the signal coverage range is divided into a plurality of radian-equal fan-shaped regions within the signal coverage range with a location of the positioning service device as a center; each user terminal with the first signal strength reaching a set strength threshold is determined as a valid user terminal; where the set strength threshold is a minimum signal strength at which the user terminal can actually receive the radio-frequency signal normally; a comprehensive feature value of each fan-shaped region is determined according to the total number of valid user terminals contained in each fan-shaped region and fan-shaped regions adjacent to the each fan-shaped region, the first signal strengths of the valid user terminals, and relative locations of the valid user terminals to the center in the signal coverage range; and the fan-shaped region with a largest comprehensive feature value in the plurality of fan-shaped regions is determined as the main region.

Figure 4:
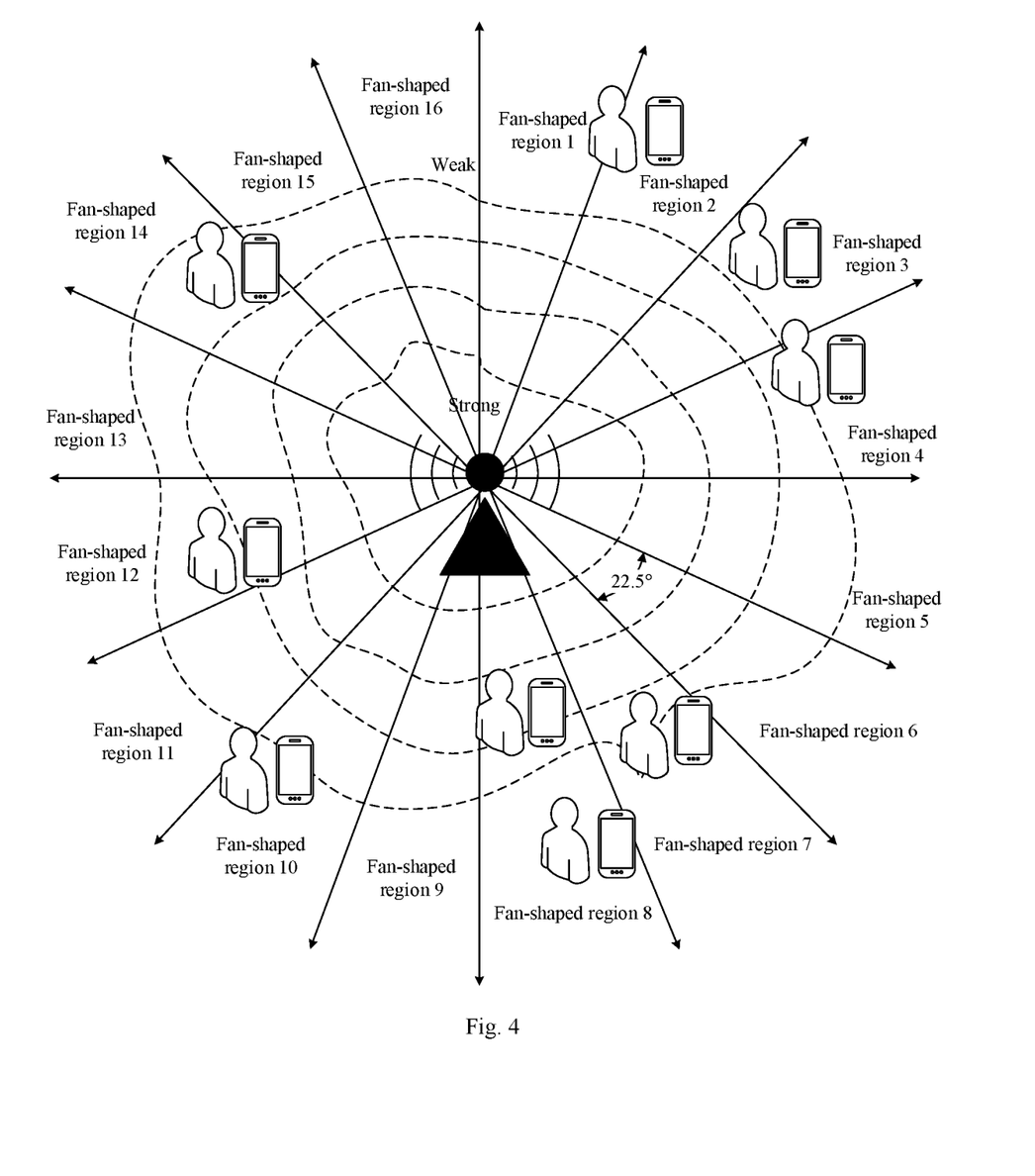
FIG. 4 is a schematic diagram of dividing fan-shaped regions provided by an embodiment of the present disclosure.

Referring to FIG. 4, FIG. 4 is a schematic diagram of dividing fan-shaped regions provided by an embodiment of the present disclosure. One non-circular curve represents one signal strength, and the signal strengths are weakened from the positioning service device towards an outside. For example, the signal strength at the location of the positioning service device is the strongest, and the signal strength represented by an outermost dotted line is the weakest.

In FIG. 4, taking the location of the positioning service device as a center, its signal coverage range is divided into 16 radian-equal fan-shaped regions (i.e. equally divided into 16 fan-shaped regions: fan-shaped region 1 to fan-shaped region 16), and radian of each region is 22.5°. The closer the user terminals are to a dotted line on an outermost side, the weaker the signal strengths of the received radio-frequency signals are (i.e. the first signal strengths are weaker); and the closer the user terminals are to the center (i.e. the positioning service device), the stronger the received signal strengths are (i.e. the first signal strengths are stronger). The set strength threshold is assumed to be a signal strength corresponding to the dotted line at the outermost side in FIG. 4. The user terminals send the first signal strengths of the radio-frequency signals to the positioning service device through the feedback information carrying the first signal strengths, and the positioning service device determines the first signal strengths corresponding to the user terminals according to the received feedback information and thereby determines the user terminals with the first signal strengths reaching the set strength threshold to be valid user terminals. In FIG. 4, the user terminals within the dotted line at the outermost side are the valid user terminals. Then, the comprehensive feature value of each fan-shaped region is determined according to the total number of the valid user terminals contained in each fan-shaped region and fan-shaped regions adjacent to the each fan-shaped region, the corresponding first signal strengths and the relative locations to the positioning service device in the signal coverage range of the positioning service device, and the fan-shaped region 8 with the largest comprehensive feature value among the fan-shaped region 1 to fan-shaped region 16 is determined as a main fan-shaped region, so the signal sending direction of each of the radio-frequency signals of the positioning service device is adjusted to be a direction where the main region is located for sending the recommendation information.

An implementation adopted for determining the comprehensive feature values is the following: the total number of the valid user terminals contained in each fan-shaped region is calculated; a relative location corresponding to the environmental feature value of each valid user terminal is determined according to a correspondence relationship between preset environmental feature values and the relative locations, to determine a distance between each user terminal and the center; where each environmental feature value includes the first signal strength and the corresponding first signal direction; and weighted calculation is performed on a total number of the valid user terminals contained in the each fan-shaped region and fan-shaped regions adjacent to the each fan-shaped region, the corresponding first signal strengths and the distances, to obtain the comprehensive feature value of the each fan-shaped region.

A formula of the above weighted calculation adopted for calculating the comprehensive feature value of any one fan-shaped region includes:

$$M_i = \sum_{j=1}^{k_i}(a_i k_i + b_i L_j + c_i \alpha_j) + \sum_{j=1}^{k_{i-1}}(a_{i-1} k_{i-1} + b_{-li} L_j + c_{i-1} \alpha_j) + \sum_{j=1}^{k_{i+1}}(a_{i+1} k_{i+1} + b_{i+1} L_j + c_{i+1} \alpha_j),$$

where: $M_i$ is the comprehensive feature value of an $i^{th}$ fan-shaped region, $k_i$ is the total number of the valid user terminals in the $i^{th}$ fan-shaped region, $k_{i+1}$ is the total number of the valid user terminals in an $(i+1)^{th}$ fan-shaped region adjacent to the $i^{th}$ fan-shaped region, $k_{i-1}$ is the total number of the valid user terminals in an $(i-1)^{th}$ fan-shaped region adjacent to the $i^{th}$ fan-shaped region, j is a $j^{th}$ valid user terminal in the $i^{th}$ fan-shaped region, $L_j$ is the distance between the $j^{th}$ valid user terminal in the corresponding fan-shaped region and the center, $\alpha_j$ is the signal direction of the radio-frequency signal received by the $j^{th}$ valid user terminal in the corresponding fan-shaped region, i and j are natural numbers, i is smaller than or equal to the total number of the fan-shaped regions in the signal coverage range, j is smaller than or equal to the total number of the valid user terminals in the corresponding fan-shaped region, $a_i$, $b_i$ and $c_i$ are weighting coefficients corresponding to $k_i$, $L_j$ and $\alpha_j$ respectively, $a_{i-1}$, $b_{i-1}$ and $c_{i-1}$ are weighting coefficients corresponding to $k_{i-1}$, $L_{j-1}$ and $\alpha_{j-1}$ respectively, and $a_{i+1}$, $b_{i+1}$ and $c_{i+1}$ are weighting coefficients corresponding to $k_{i+1}$, $L_{j+1}$ and $\alpha_{j+1}$ respectively.

Figure 5:
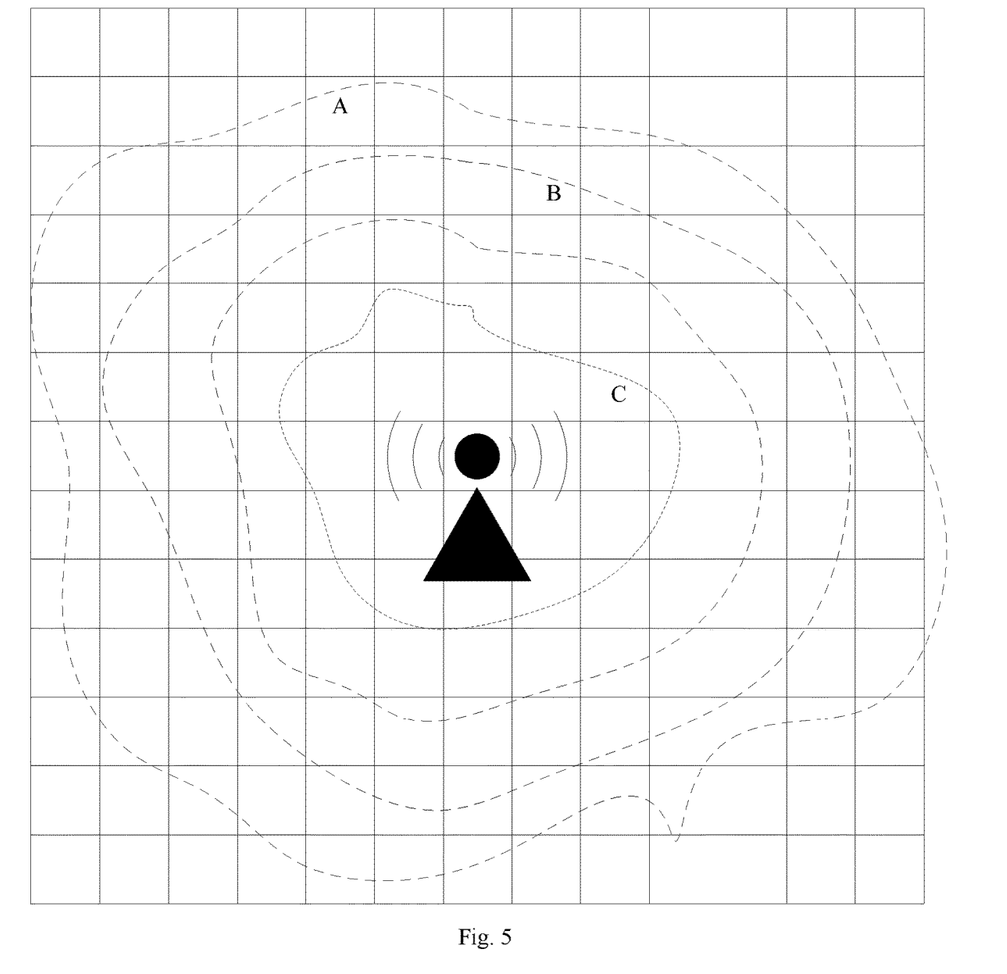
FIG. 5 is a schematic diagram of a gridded signal coverage range provided by an embodiment of the present disclosure.

The correspondence relationship between the preset environmental feature values and the relative locations is obtained through the following: the signal coverage range of the positioning service device is gridded into a plurality of grid regions; a signal strength and a signal direction (for convenience of distinguishing, they are called a second signal strength and a second signal direction) of the radio-frequency signal received by the user terminal in each grid region are detected, and are determined as the network feature value of the corresponding grid region; and then a relative location (to the positioning service device) of each grid region is related to the corresponding network feature value to obtain the correspondence relationship between the preset environmental feature values and the locations. The above correspondence relationship may be stored in a database or at a designated location.

Referring to FIG. 5, FIG. 5 is a schematic diagram of a gridded signal coverage range provided by an embodiment of the present disclosure.

To take 3 grid regions A, B and C in FIG. 5 as examples, the user terminal receives the radio-frequency signal from the positioning service device at the grid region A, the received signal strength (called a second signal strength A, to distinguish the signal strength from the signal strengths of other grid regions) are detected, the second signal direction (called the second signal direction A, to distinguish the same from the signal directions of other grid regions) of the received radio-frequency signal is determined, and the second signal strength A and the second signal direction A are determined to be the environmental feature value A of the grid region A, similarly, the environmental feature values of other grid regions may be obtained. For example, the environmental feature value B of the grid region B is composed of a second signal strength B and a second signal direction B, and the environmental feature value C of the grid region C is composed of a second signal strength C and a second signal direction C.

Afterwards, the relative location of the grid region A is related to the environmental feature value A, and an element in the preset correspondence relationship between the environmental feature values and the relative locations may be formed. For example, assuming that the relative location of the grid region A is recorded as $(x_A, y_A)$, the second signal strength A and the second signal direction A are respectively recorded as $\lambda_{A1}$ and $\lambda_{A1}$, the environmental feature value A may be recorded as $\{\lambda_{A1}, \lambda_{A1}\}$, and the relative location of the grid region A is related to the environmental feature value A, which may be recorded as $(x_A, y_A) = \{\lambda_{A1}, \lambda_{A1}\}$. A process of relating the relative locations of other grid regions to the corresponding environmental feature values is similar to that and repeated description will not be made. After relating the relative locations of all grid regions to the corresponding environmental feature values, the correspondence relationship between the preset environmental feature values and the relative locations may be obtained.

The environmental feature value of the grid region may further include user activity degrees and other feature values.

The positioning service device may use phased antennas to send the radio-frequency signals. When the signal sending direction of each of the radio-frequency signals is adjusted to the direction where the main region is located for sending the recommendation information, the rated power of the phased antennas in the positioning service device may be configured to perform sending, and a transmission power of the positioning service device may also be adjusted to save the transmission power and lower errors of radio-frequency parameters (such as vectors), which is specifically implemented through the following.

The signal coverage range is divided into a plurality of signal strength grade regions; a due power corresponding to each radio-frequency signal when the first signal strength of each user terminal reaches a set strength on an outer boundary of a designated signal strength grade region is determined; where the designated signal strength grade region is a signal grade region designated in the plurality of signal strength grade regions, and the outer boundary is a boundary of the designated signal strength grade region away from the positioning service device; a smaller one between the due power and a rated power of a phased antenna in the positioning service device is determined as a first sending power for sending the each radio-frequency signal; and the each radio-frequency signal carrying the recommendation information is sent at the first sending power in the direction where the main region is located.

The above designated signal strength grade region may be determined based on practical experience. For example, it is determined that a majority of users are distributed within an outer boundary of a certain signal strength grade region based on analysis of distribution of users within the signal coverage range of the positioning service device in one month, one season or half a year, and the signal strength grade region is determined as the designated signal strength grade region; or the designated signal strength grade region may also be determined in real time according to distribution of users (or user terminals) calculated on site, which is not specifically limited here.

Figure 6:
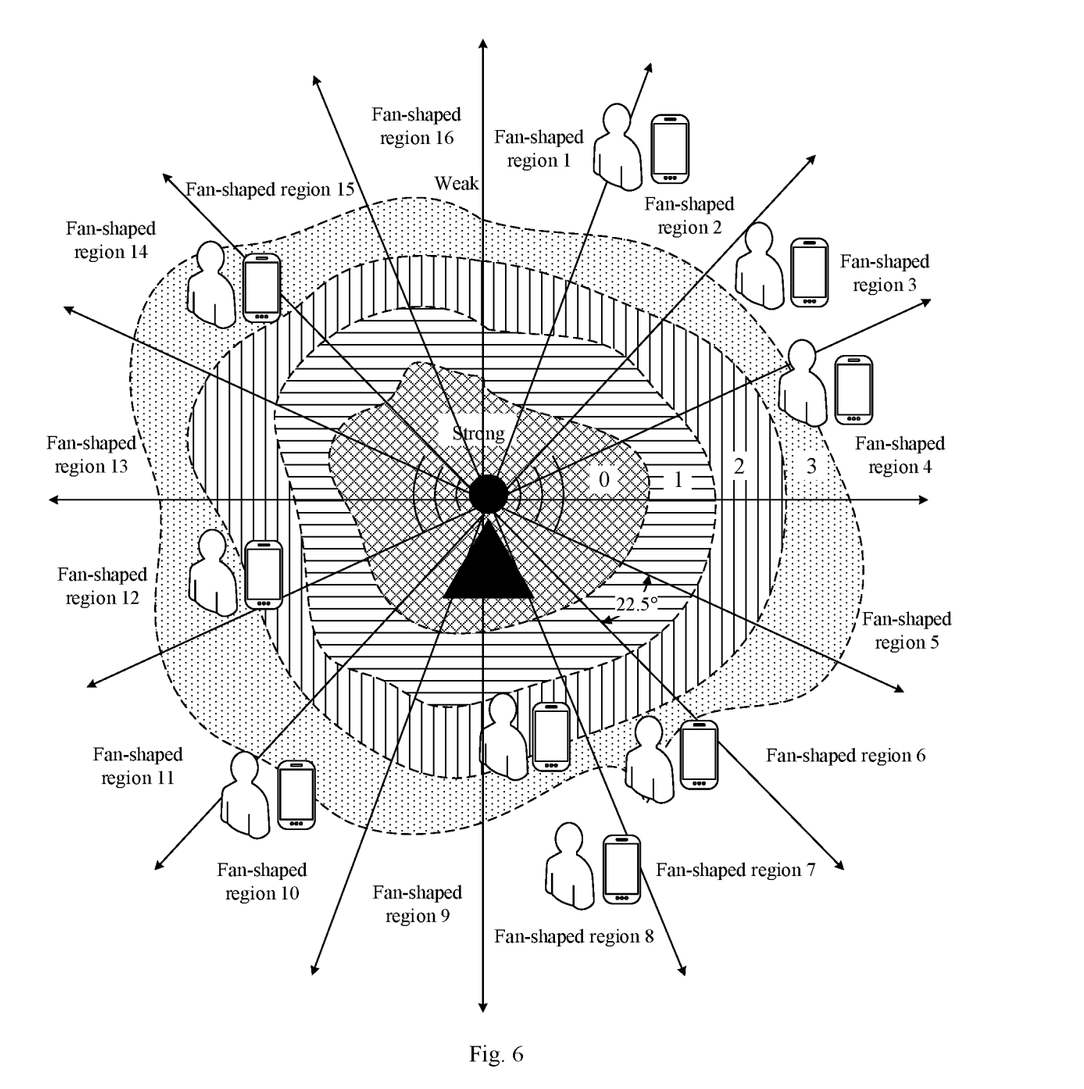
FIG. 6 is a schematic diagram of dividing signal strength grade regions provided by an embodiment of the present disclosure.

Referring to FIG. 6, FIG. 6 is a schematic diagram of dividing signal strength grade regions provided by an embodiment of the present disclosure. Four signal strength grade regions 0 to 3 are illustrated in FIG. 6, and the strengths of the radio-frequency signals sent by the positioning service device and received by the user terminals in the signal grade regions 0 to the signal grade region 3 are sequentially reduced. It can be seen from FIG. 6 that, each signal grade region includes 2 boundaries; one is a boundary close to the positioning service device, i.e. a common boundary with a previous signal grade region; and the other one is a boundary away from the positioning service device, i.e. a common boundary with a next signal grade region.

In order to ensure that the user terminals can normally receive the radio-frequency signals sent by the positioning service device at the outer boundary of the designated signal strength grade region, the first signal strengths of the radio-frequency signals received by the user terminals at the outer boundary of the designated signal strength grade region needs to reach the set strength, and the positioning service device determines the due power when sending the radio-frequency signals according to the set strength. However, the due power may be affected by the number of the user terminals or the obstructions, so the due power may exceed the rated power of the phased antennas in the positioning service device. Therefore, a smaller one between the due power and the rated power needs to be selected as the first sending power actually used by the positioning service device to send the radio-frequency signals, and the phased antennas in the positioning service device are thereby controlled to send the radio-frequency signals carrying the recommendation information at the first sending power in the direction where the main region is located, so that the positioning service device can push the recommendation information to maximum users to a greatest extent while the sending power can be saved.

In one possible implementation, the determining the due power corresponding to the each radio-frequency signal when the first signal strength of each user terminal reaches the set strength on the outer boundary of the designated signal strength grade region may be realized through the following: the total number of user terminals receiving the radio-frequency signals between an inner boundary of the designated signal strength grade region and a boundary corresponding to a set signal strength is determined; where the inner boundary is a boundary of the designated signal strength grade region close to the positioning service device; a second sending power of each user terminal at the outer boundary is determined according to the total number of the user terminals receiving the radio-frequency signals between the inner boundary of the designated signal strength grade region and the boundary corresponding to the set signal strength and a third signal strength of the each user terminal at the outer boundary; and a product of the second sending power and a sending power weighting value is determined as the due power.

A formula for determining the second sending power of each user terminal at the outer boundary includes: $Q_s = C_s \times N_s + d_s \times a_s$, where: $Q_s$ is the second sending power of each user terminal at the outer boundary, $C_s$ is a weighting coefficient, a unit of $C_s$ is power/person, $N_s$ is the total number of the user terminals receiving the radio-frequency signals between the inner boundary of the designated signal strength grade region and the boundary corresponding to the set signal strength, $d_s$ is a weighting coefficient of the signal strength, and $a_s$ is a designated signal strength.

Figure 7:
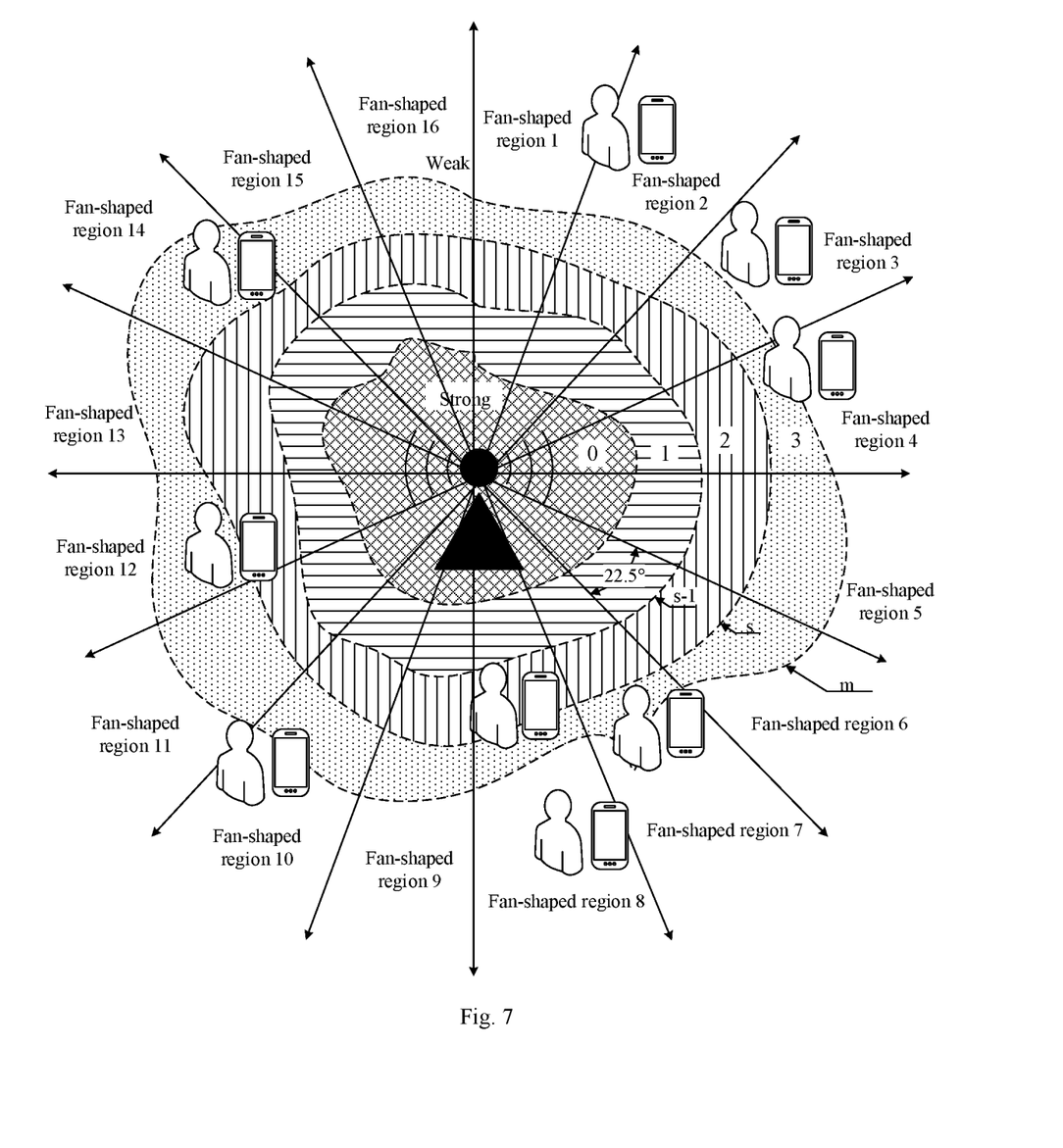
FIG. 7 is a schematic diagram of a relationship between a designated signal strength grade region and a boundary corresponding to a set signal strength provided by an embodiment of the present disclosure.

Referring to FIG. 7, FIG. 7 is a schematic diagram of a relationship between a designated signal strength grade region and a boundary corresponding to a set signal strength provided by an embodiment of the present disclosure.

In FIG. 7, m is the boundary corresponding to the set signal strength, the designated signal strength grade region is the signal strength grade region 2, s is the outer boundary of the designated signal strength grade region, and s−1 is the inner boundary of the designated signal strength grade region. According to the first signal strengths carried in the feedback information sent by the user terminals, the total number (recorded as $N_s$) of the user terminals receiving the radio-frequency signals with the first signal strengths between the inner boundary s−1 of the designated signal strength grade region and the boundary m corresponding to the set signal strength (recorded as (s−1, m)) may be determined, and then the second sending power (recorded as $Q_s$) is calculated according to the above formula for calculating the second sending power. Assuming that the due power corresponding to the outer boundary s of the designated signal strength grade region is Ps, and that a sending power weighting value is $Q_0$, $Ps=Q_0 \times Q_s$.

Figure 8:
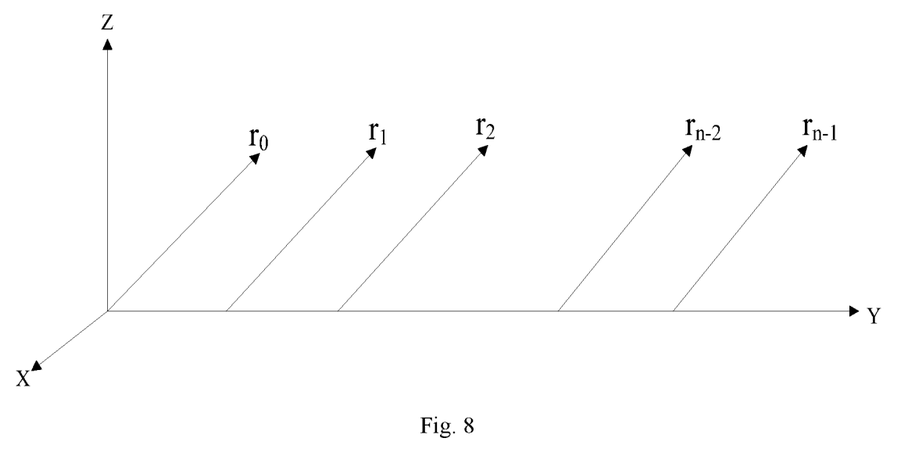
FIG. 8 is a schematic diagram of adjusting directions of antennas in a phased antenna array provided by an embodiment of the present disclosure.

The positioning service device adopts a phased antenna array to control the sending directions and sending powers of the radio-frequency signals bearing the recommendation information, and controls the sending directions and sending powers of the radio-frequency signals bearing the recommendation information by changing angles of antennas and transmission powers of the antennas in the phased antenna array.

Referring to FIG. 8, FIG. 8 is a schematic diagram of adjusting directions of antennas in a phased antenna array provided by the present disclosure. In FIG. 8, the phased antenna array includes n antennas ($r_0$-$r_{n-1}$). By adjusting directions of the antennas in a three-dimensional space. i.e. adjusting the directions of the antennas by adjusting included angles between the antennas and axis X, axis Y and axis Z respectively, a sum of vectors of the n antennas (one antenna corresponding to one vector) points towards the transmission directions of the radio-frequency signals carrying the recommendation information.

Figure 9:
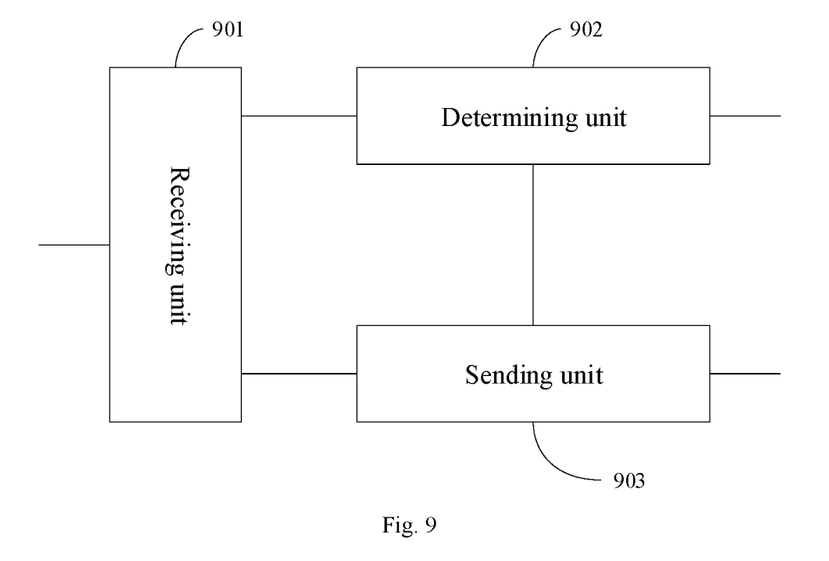
FIG. 9 is a schematic structural diagram of a positioning service device provided by an embodiment of the present disclosure.

Based on the same inventive concept, an embodiment of the present disclosure provides a positioning service device. For specific implementations of a method for sending recommendation information of the positioning service device, reference may be made to descriptions in the method embodiment part, and repetition will not be made. Referring to FIG. 9, the positioning service device includes: a receiving unit 901, configured to receive feedback signals sent by user terminals within a signal coverage range of the positioning service device, where each feedback signal carries a first signal strength and a first signal direction of a radio-frequency signal sent by the positioning service device and received by the corresponding user terminal; a determining unit 902, configured to determine, according to the first signal strength and the first signal direction corresponding to each user terminal, a main region where the user terminals are concentrated within the signal coverage range; and a sending unit 903, configured to adjust a signal sending direction of each radio-frequency signal to a direction where the main region is located and send the recommendation information, where the recommendation information is borne by the radio-frequency signals.

In one possible implementation, the receiving unit 901 is configured to: send the radio-frequency signal to the user terminals within the signal coverage range, so that the user terminals determine the first signal strengths of the radio-frequency signals received; and receive the feedback signals carrying the first signal strengths from the user terminals.

In one possible implementation, the determining unit 902 is configured to: divide the signal coverage range into a plurality of radian-equal fan-shaped regions within the signal coverage range with a location of the positioning service device as a center; determine each user terminal with the first signal strength reaching a set strength threshold as a valid user terminal, where the set strength threshold is a minimum signal strength at which the each user terminal can actually receive the radio-frequency signal normally; determine a comprehensive feature value of each fan-shaped region according to a total number of valid user terminals contained in each fan-shaped region and fan-shaped regions adjacent to the each fan-shaped region, first signal strengths of the valid user terminals, and relative locations of the valid user terminals to the center in the signal coverage range; and determine a fan-shaped region with a largest comprehensive feature value in the plurality of fan-shaped regions as the main region.

In one possible implementation, the determining unit 902 is further configured to: divide the signal coverage range into 16 equal fan-shaped regions with the location of the positioning service device as the center.

In one possible implementation, the determining unit 902 is further configured to: calculate the total number of the valid user terminals contained in each fan-shaped region; determine, according to a correspondence relationship between preset environmental feature values and relative locations, a relative location corresponding to the environmental feature value of each valid user terminal, to determine a distance between each user terminal and the center, where each environmental feature value includes the first signal strength and the corresponding first signal direction; and perform weighted calculation on the total number of the valid user terminals contained in each fan-shaped region and fan-shaped regions adjacent to the each fan-shaped region, the first signal strengths and the distances corresponding to the valid user terminals, to obtain the comprehensive feature value of each fan-shaped region.

In one possible implementation, the determining unit 902 is further configured to: grid the signal coverage range into a plurality of grid regions; detect a second signal strength and a second signal direction of the radio-frequency signal received by the user terminal in each grid region, and determine the second signal strength and the second signal direction as a network feature value of the each grid region; and relate a location of each grid region to the network feature value corresponding to the each grid region, to obtain the correspondence relationship between the preset environmental feature values and the relative locations.

In one possible implementation, a formula of the weighted calculation includes:

$$M_i = \sum_{j=1}^{k_i}(a_i k_i + b_i L_j + c_i \alpha_j) + \sum_{j=1}^{k_{i-1}}(a_{i-1} k_{i-1} + b_{-li} L_j + c_{i-1} \alpha_j) + \sum_{j=1}^{k_{i+1}}(a_{i+1} k_{i+1} + b_{i+1} L_j + c_{i+1} \alpha_j),$$

where: $M_i$ is the comprehensive feature value of an $i^{th}$ fan-shaped region, $k_i$ is the total number of the valid user terminals in the $i^{th}$ fan-shaped region, $k_{i+1}$ is the total number of the valid user terminals in an $(i+1)^{th}$ fan-shaped region adjacent to the $i^{th}$ fan-shaped region, $k_{i-1}$ is the total number of the valid user terminals in an $(i-1)^{th}$ fan-shaped region adjacent to the $i^{th}$ fan-shaped region, j is a $j^{th}$ valid user terminal in the $i^{th}$ fan-shaped region, $L_j$ is a distance between the $j^{th}$ valid user terminal in the corresponding fan-shaped region and the center, $\alpha_j$ is the signal direction of the radio-frequency signal received by the $j^{th}$ valid user terminal in the corresponding fan-shaped region, i and j are natural numbers, i is smaller than or equal to the total number of the fan-shaped regions in the signal coverage range, j is smaller than or equal to the total number of the valid user terminals in the corresponding fan-shaped region, $a_i$, $b_i$ and $c_i$ are weighting coefficients corresponding to $k_i$, $L_j$ and $\alpha_j$ respectively, $a_{i-1}$, $b_{i-1}$ and $c_{i-1}$ are weighting coefficients corresponding to $k_{i-1}$, $L_{j-1}$ and $\alpha_{j-1}$ respectively, and $a_{i+1}$, $b_{i+1}$ and $c_{i+1}$ are weighting coefficients corresponding to $k_{i+1}$, $L_{j+1}$ and $\alpha_{j+1}$ respectively.

In one possible implementation, the sending unit 903 is further configured to: divide the signal coverage range into a plurality of signal strength grade regions; determine a due power corresponding to the each radio-frequency signal when the first signal strength of each user terminal reaches a set strength on an outer boundary of a designated signal strength grade region, where the designated signal strength grade region is a signal grade region designated in the plurality of signal strength grade regions, and the outer boundary is a boundary of the designated signal strength grade region away from the positioning service device; determine a smaller one between the due power and a rated power of a phased antenna in the positioning service device as a first sending power for sending the each radio-frequency signal; and send the each radio-frequency signal carrying the recommendation information at the first sending power in the direction where the main region is located.

In one possible implementation, the sending unit 903 is further configured to: determine the total number of user terminals receiving the radio-frequency signals between an inner boundary of the designated signal strength grade region and a boundary corresponding to a set signal strength, where the inner boundary is a boundary of the designated signal strength grade region close to the positioning service device; determine a second sending power of each user terminal at the outer boundary according to the total number of the user terminals receiving the radio-frequency signals between the inner boundary and the boundary corresponding to the set signal strength and a third signal strength of each user terminal at the outer boundary; and determine a product of the second sending power and a sending power weighting value as the due power.

In one possible implementation, a formula for determining the second sending power of each user terminal at the outer boundary includes: $Q_s = C_s \times N_s + d_s \times a_s$, where: $Q_s$ is the second sending power of each user terminal at the outer boundary, $C_s$ is a weighting coefficient, a unit of $C_s$ is power/person, $N_s$ is the total number of the user terminals receiving the radio-frequency signals between the inner boundary and the boundary corresponding to the set signal strength, $d_s$ is a weighting coefficient of the signal strength, $a_s$ is a designated signal strength.

In one possible implementation, the positioning service device adopts a phased antenna array to control sending directions and sending powers of the radio-frequency signals bearing the recommendation information, and controls the sending directions and sending powers of the radio-frequency signals bearing the recommendation information by changing angles of antennas and transmission powers of the antennas in the phased antenna array.

Based on the same inventive concept, an embodiment of the present disclosure provides a positioning service device, including: at least one processor; and a memory connected with the at least one processor. The memory stores an instruction executable by the at least one processor, and the at least one processor executes the above method for sending the recommendation information.

Those of skill in the art should understand that embodiments of the present disclosure may be provided as a method, a system, or a computer program product. Accordingly, the embodiments of the present disclosure may take the form of an entirely hardware embodiment, an entirely software embodiment, or an embodiment combining software and hardware aspects. Furthermore, the embodiments of the present disclosure may take the form of a computer program product implemented on one or more computer-usable storage media containing computer-usable program codes therein, including but not limited to a disk memory, a compact disc read-only memory (CD-ROM), an optical memory, and the like.

The embodiments of the present disclosure are described with reference to flowchart and/or block diagrams of methods, apparatuses (systems), and computer program products according to the embodiments of the present disclosure. It should be understood that each flow and/or block in the flowcharts and/or block diagrams, and combinations of flows and/or blocks in the flowcharts and/or block diagrams, can be combined by computer program instructions. These computer program instructions may be provided to a processor of a general purpose computer, a special purpose computer, an embedded processor or other programmable data processing device to produce a machine such that the instructions executed by the processor of the computer or other programmable data processing device produce an apparatus for implementing functions specified in one or more flows of the flowcharts and/or one or more blocks of the block diagrams.

These computer program instructions may also be stored in a computer-readable memory capable of directing a computer or other programmable data processing apparatus to operate in a particular manner, such that the instructions stored in the computer-readable memory result in an article of manufacture including instruction apparatuses. The instruction apparatuses implement the functions specified in one or more flows of the flowcharts and/or one or more blocks of the block diagrams.

These computer program instructions can also be loaded on a computer or other programmable data processing device, so that a series of operational steps are performed on the computer or other programmable device to produce a computer-implemented process. Therefore, instructions executed on the above computer or other programmable device provide steps for implementing the functions specified in one or more flows of the flowcharts and/or one or more blocks of the block diagrams.

Obviously, those of skill in the art can make various changes and modifications to the present disclosure without departing from the spirit and scope of the present disclosure. Thus, if these changes and modifications of the present disclosure fall within the scope of the claims of the present disclosure and their equivalents, the present disclosure is also intended to include these modifications and variations.

What is claimed is:

1. A method for sending recommendation information, applied to a positioning service device, and comprising:

receiving feedback signals sent by user terminals within a signal coverage range of the positioning service device, wherein the feedback signals carry first signal strengths and first signal directions of radio-frequency signals sent by the positioning service device and received by the user terminals;

determining, according to the first signal strengths and the first signal directions corresponding to the user terminals, a main region where the user terminals are concentrated within the signal coverage range; and adjusting a signal sending direction of each of the radio-frequency signals to a direction where the main region is located and sending the recommendation information, wherein the recommendation information is borne by the radio-frequency signals;

wherein the determining, according to the first signal strengths corresponding to the user terminals, the main region where the user terminals are concentrated within the signal coverage range comprises:

dividing the signal coverage range into a plurality of radian-equal fan-shaped regions within the signal coverage range with a location of the positioning service device as a center;

determining each of the user terminals with the first signal strengths reaching a set strength threshold as a valid user terminal, wherein the set strength threshold is a minimum signal strength at which the each user terminal can actually receive a radio-frequency signal normally;

determining a comprehensive feature value of each of the fan-shaped regions according to a total quantity of valid user terminals comprised in the each fan-shaped region and fan-shaped regions adjacent to the each fan-shaped region, first signal strengths of the valid user terminals, and relative locations of the valid user terminals to the center in the signal coverage range; and determining a fan-shaped region with a largest comprehensive feature value in the plurality of fan-shaped regions as the main region.

2. The method according to claim 1, wherein the receiving the feedback signals sent by the user terminals within the signal coverage range of the positioning service device comprises:

sending the radio-frequency signals to the user terminals within the signal coverage range, to make the user terminals determine the first signal strengths of the radio-frequency signals received; and receiving the feedback signals carrying the first signal strengths from the user terminals.

3. The method according to claim 1, wherein the dividing the signal coverage range into the plurality of radian-equal fan-shaped regions with the location of the positioning service device as the center comprises:

dividing the signal coverage range into 16 equal fan-shaped regions with the location of the positioning service device as the center.

4. The method according to claim 1, wherein the determining the comprehensive feature value of each of the fan-shaped regions according to the total quantity of the valid user terminals comprised in the each fan-shaped region and fan-shaped regions adjacent to the each fan-shaped region, the first signal strengths of the valid user terminals, and the relative locations of the valid user terminals to the center in the signal coverage range comprises:

calculating the total quantity of the valid user terminals comprised in the each fan-shaped region and the fan-shaped regions adjacent to the each fan-shaped region;

determining, according to a correspondence relationship between preset environmental feature values and the relative locations, the relative locations corresponding to the environmental feature values of the valid user terminals, to determine distances between the valid user terminals and the center, wherein the environmental feature values comprise the first signal strengths and corresponding first signal directions; and performing weighted calculation on the total quantity of the valid user terminals comprised in the each fan-shaped region and the fan-shaped regions adjacent to the each fan-shaped region, and the first signal strengths and the distances corresponding to the valid user terminals, to obtain the comprehensive feature value of the each fan-shaped region.

5. The method according to claim 4, wherein the determining the correspondence relationship between the preset environmental feature values and the relative locations comprises:

gridding the signal coverage range into a plurality of grid regions;

detecting a second signal strength and a second signal direction of a radio-frequency signals received by a user terminal in each of the plurality of grid regions, and determining the second signal strength and the second signal direction as a network feature value of the each grid region; and relating a location of the each grid region to the network feature value corresponding to the each grid region, to obtain the correspondence relationship between the preset environmental feature values and the relative locations.

6. The method according to claim 4, wherein a formula of the weighted calculation comprises:

$$M_i = \sum_{j=1}^{k_i}(a_i k_i + b_i L_j + c_i \alpha_j) + \sum_{j=1}^{k_{i-1}}(a_{i-1}k_{i-1} + b_{-1i}L_j + c_{i-1}\alpha_j) + \sum_{j=1}^{k_{i+1}}(a_{i+1}k_{i+1} + b_{i+1}L_j + c_{i+1}\alpha_j),$$

wherein $M_i$ is the comprehensive feature value of an $i^{th}$ fan-shaped region, $k_i$ is a total quantity of the valid user terminals in the $i^{th}$ fan-shaped region, $k_{i+1}$ is a total quantity of the valid user terminals in an (i+1)th fan-shaped region adjacent to the $i^{th}$ fan-shaped region, $k_{i-1}$ is a total quantity of the valid user terminals in an (i−1)th fan-shaped region adjacent to the $i^{th}$ fan-shaped region, j is a $j^{th}$ valid user terminal in the $i^{th}$ fan-shaped region, $L_j$ is a distance between the $j^{th}$ valid user terminal in a corresponding fan-shaped region and the center, $\alpha_j$ is a signal direction of a radio-frequency signal received by the $j^{th}$ valid user terminal in the corresponding fan-shaped region, i and j are natural numbers, i is smaller than or equal to a total quantity of the fan-shaped regions in the signal coverage range, j is smaller than or equal to a total quantity of the valid user terminals in the corresponding fan-shaped region, $a_i$, $b_i$ and $c_i$ are weighting coefficients corresponding to $k_i$, $L_j$ and $\alpha_j$ respectively, $a_{i-1}$, $b_{i-1}$ and $c_{i-1}$ are weighting coefficients corresponding to $k_{i-1}$, $L_{j-1}$ and $d_{j-1}$ respectively, and $a_{i+1}$, $b_{i+1}$ and $c_{i-1}$ are weighting coefficients corresponding to $k_{i+1}$, $L_{j+1}$ and $c_{j+1}$ respectively.

7. The method according to claim 1, wherein the adjusting the signal sending direction of each of the radio-frequency signals to the direction where the main region is located and sending the recommendation information comprises:
dividing the signal coverage range into a plurality of signal strength grade regions;
determining a due power corresponding to the each radio-frequency signal when a first signal strength of each of the user terminals reaches a set strength on an outer boundary of a designated signal strength grade region, wherein the designated signal strength grade region is a signal grade region designated in the plurality of signal strength grade regions, and the outer boundary is a boundary of the designated signal strength grade region away from the positioning service device;
determining a smaller one between the due power and a rated power of a phased antenna in the positioning service device as a first sending power for sending the each radio-frequency signal; and
sending the each radio-frequency signal carrying the recommendation information at the first sending power in the direction where the main region is located.

8. The method according to claim 7, wherein the determining the due power corresponding to the each radio-frequency signal when the first signal strength of each of the user terminals reaches the set strength on the outer boundary of the designated signal strength grade region comprises:
determining a total quantity of the user terminals receiving the radio-frequency signals between an inner boundary of the designated signal strength grade region and a boundary corresponding to a set signal strength, wherein the inner boundary is a boundary of the designated signal strength grade region close to the positioning service device;
determining a second sending power of the each user terminal at the outer boundary according to the total quantity of the user terminals receiving the radio-frequency signals between the inner boundary and the boundary corresponding to the set signal strength and a third signal strength of the each user terminal at the outer boundary; and
determining a product of the second sending power and a sending power weighting value as the due power.

9. The method according to claim 8, wherein a formula for determining the second sending power of the each user terminal at the outer boundary comprises:

$Q_s = C_s \times N_s + d_s \times a_s,$ wherein $Q_s$ is the second sending power of the each user terminal at the outer boundary, $C_s$ is a weighting coefficient, a unit of $C_s$ is power/person, $N_s$ is the total quantity of the user terminals receiving the radio-frequency signals between the inner boundary and the boundary corresponding to the set signal strength, $d_s$ is a weighting coefficient of the signal strength, $a_s$ is a designated signal strength.

10. The method according to claim 7, wherein the positioning service device adopts a phased antenna array to control sending directions and sending powers of the radio-frequency signals bearing the recommendation information, and controls the sending directions and the sending powers of the radio-frequency signals bearing the recommendation information by changing angles of antennas and transmission powers of the antennas in the phased antenna array.

11. A positioning service device, comprising:
a receiving unit, configured to receive feedback signals sent by user terminals within a signal coverage range of the positioning service device, wherein the feedback signals carry first signal strengths of radio-frequency signals sent by the positioning service device and received by the user terminals;
a determining unit, configured to determine, according to the first signal strengths corresponding to the user terminals, a main region where the user terminals are concentrated within the signal coverage range; and
a sending unit, configured to adjust a signal sending direction of each of the radio-frequency signals to a direction where the main region is located and send the recommendation information, wherein the recommendation information is borne by the radio-frequency signals;
wherein the determining unit is further configured to:
divide the signal coverage range into a plurality of radian-equal fan-shaped regions within the signal coverage range with a location of the positioning service device as a center;
determine each of the user terminals with the first signal strengths reaching a set strength threshold as a valid user terminal, wherein the set strength threshold is a minimum signal strength at which the each user terminal can actually receive a radio-frequency signal normally;
determine a comprehensive feature value of each of the fan-shaped regions according to a total quantity of valid user terminals comprised in the each fan-shaped region and fan-shaped regions adjacent to the each fan-shaped region, first signal strengths of the valid user terminals, and relative locations of the valid user terminals to the center in the signal coverage range; and
determine a fan-shaped region with a largest comprehensive feature value in the plurality of fan-shaped regions as the main region.

12. A positioning service device, comprising:
at least one processor; and
a memory connected with the at least one processor;
wherein the memory stores an instruction executable by the at least one processor, and the at least one processor executes the method according to claim 1 by executing the instruction stored by the memory.

* * * * *